US007544934B2

(12) United States Patent
Senko

(10) Patent No.: US 7,544,934 B2
(45) Date of Patent: Jun. 9, 2009

(54) SYSTEM AND METHOD FOR IMPLEMENTING BALANCED RF FIELDS IN AN ION TRAP DEVICE

(75) Inventor: Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 12/113,915

(22) Filed: May 1, 2008

(65) Prior Publication Data

US 2008/0203294 A1 Aug. 28, 2008

Related U.S. Application Data

(63) Continuation of application No. 11/437,038, filed on May 19, 2006, now Pat. No. 7,385,193.

(51) Int. Cl.
*H01J 49/42* (2006.01)
*B01D 59/44* (2006.01)

(52) U.S. Cl. ....................... 250/292; 250/293; 250/282; 250/281

(58) Field of Classification Search ................. 250/292, 250/293, 282, 281
See application file for complete search history.

(56) References Cited

U.S. PATENT DOCUMENTS 6,797,950 B2 * 9/2004 Schwartz et al. ............ 250/292
7,034,294 B2 * 4/2006 Schwartz et al. ............ 250/292
2008/0156986 A1 * 7/2008 Schwartz .................... 250/293

* cited by examiner

*Primary Examiner*—Nikita Wells
(74) *Attorney, Agent, or Firm*—Charles B. Katz; Gregory J. Koerner

(57) ABSTRACT

A system and method are disclosed for effectively compensating for an unbalanced or non-zero centerline radio-frequency potential in a quadrupolar ion trap, the unbalanced centerline potential created by a compensation feature that minimizes non-linear field components created by one or more ejection slots in the ion trap. The ion trap includes a centerline that passes longitudinally through a trapping volume inside of the ion trap, a pair of Y electrodes with inner Y electrode surfaces that are approximately parallel to the centerline, and a pair of X electrodes with inner X electrode surfaces that are approximately parallel to the centerline. The X electrodes have ejection slots through which trapped ions are ejected from the ion trap. A Y signal with a Y signal amplitude is coupled to both of the Y electrodes. An X signal with an X signal amplitude is coupled to both of the X electrodes. The X signal amplitude is selected to be greater than the Y signal amplitude to thereby create a balanced centerline potential at the centerline of the ion trap device.

3 Claims, 12 Drawing Sheets

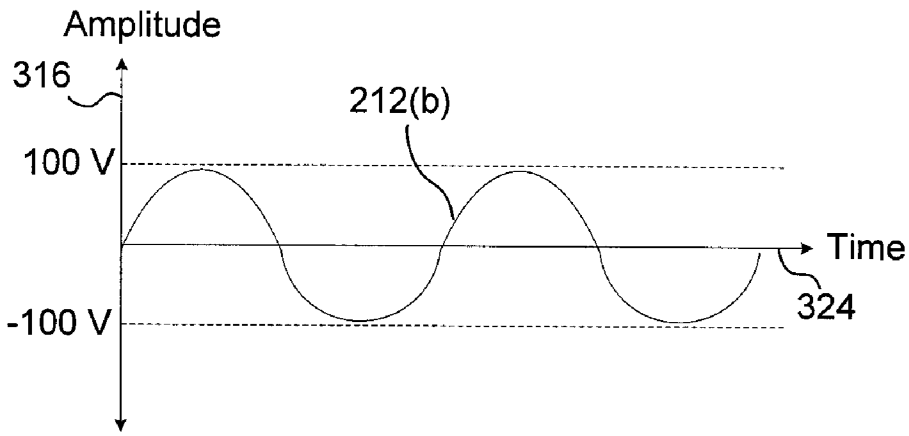
Fig. 7A RF Signal X
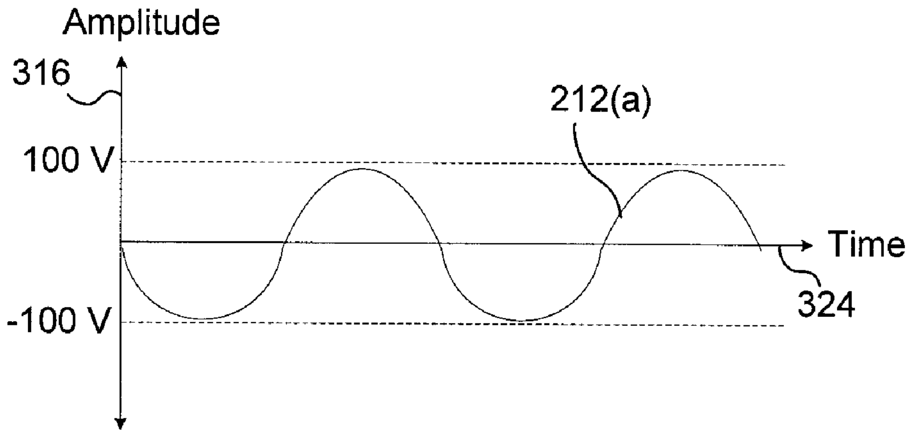
Fig. 7B RF Signal Y
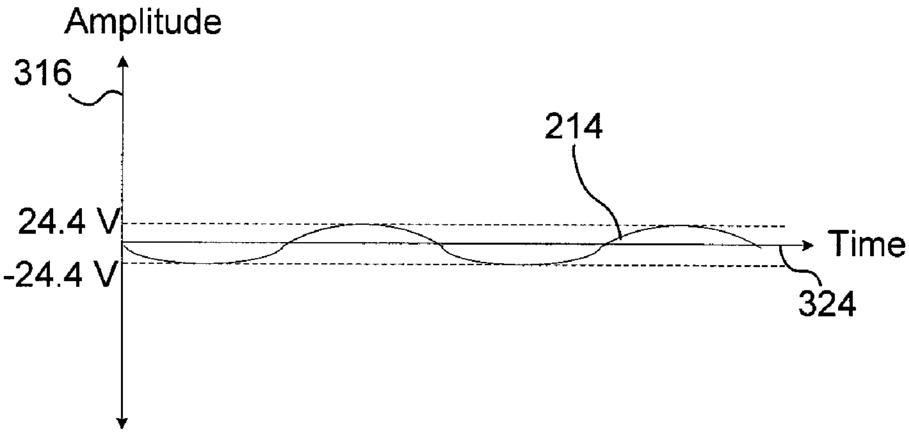
Fig. 7C Centerline

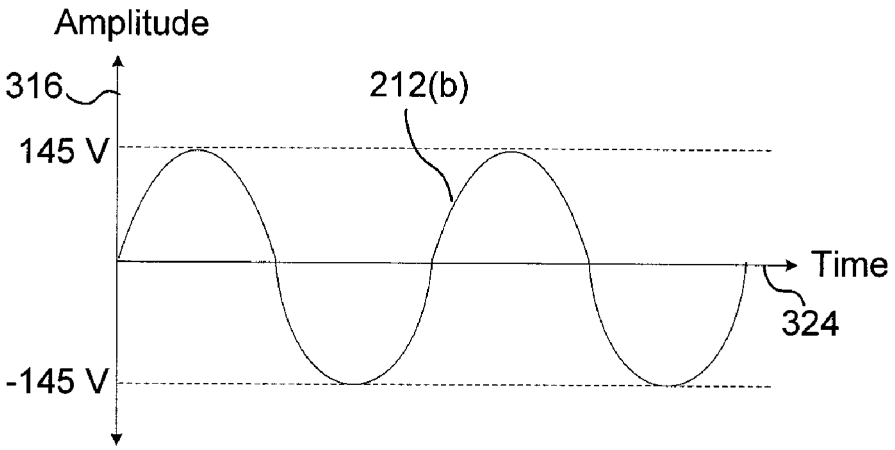
Fig. 8A RF Signal X
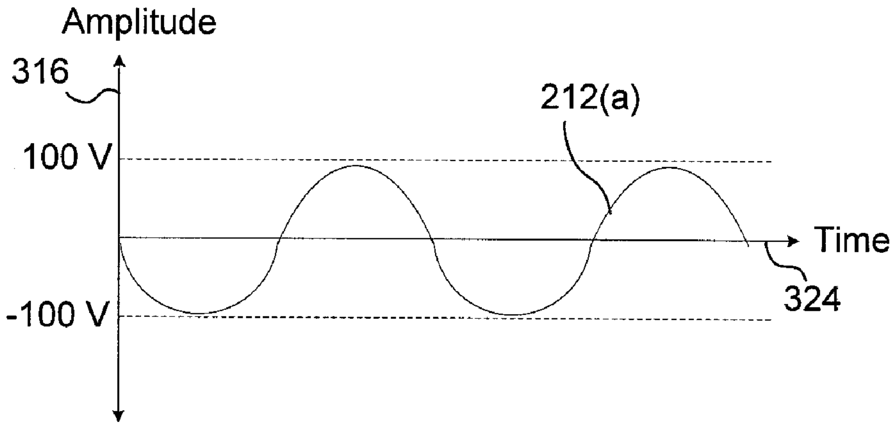
Fig. 8B RF Signal Y
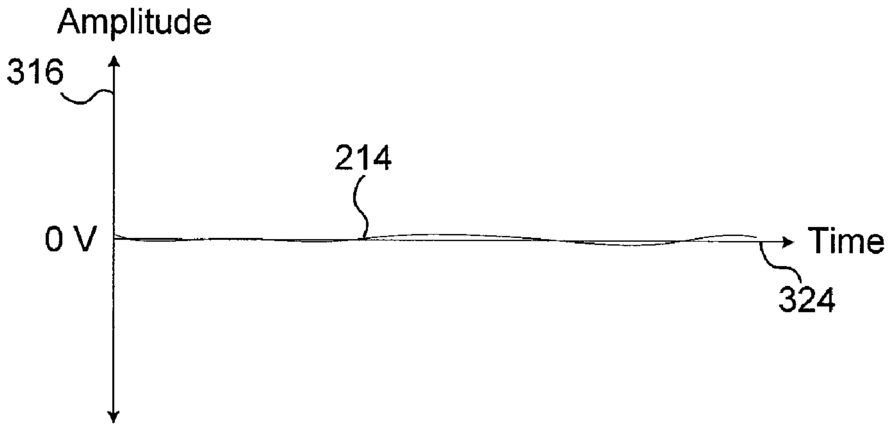
Fig. 8C Centerline

SYSTEM AND METHOD FOR IMPLEMENTING BALANCED RF FIELDS IN AN ION TRAP DEVICE

CROSS-REFERENCE TO RELATED APPLICATIONS

This application is a continuation of and claims the priority benefit under 35 U.S.C. §120 of U.S. patent application Ser. No. 11/437,038 entitled "System and Method for Implementing Balanced RF Fields in an Ion Trap Device", filed May 19, 2006 now U.S. Pat. No. 7,385,193, the entire disclosure of which is incorporated by reference.

FIELD OF THE INVENTION

The disclosed embodiments of the present invention relate generally to techniques for implementing an ion trap device, and relate more particularly to a system and method for implementing balanced radio-frequency (RF) fields in an ion trap device.

BACKGROUND OF THE INVENTION

Developing effective methods for implementing analytical instrumentation is a significant consideration for designers and manufacturers of contemporary electronic analytical devices. However, effectively performing analysis procedures with electronic devices may create substantial challenges for system designers. For example, increased demands for enhanced device functionality and performance may require more system functionality and require additional resources. An increase in functionality or other requirements may also result in a corresponding detrimental economic impact due to increased production costs and operational inefficiencies.

Furthermore, system capability to perform various enhanced operations may provide additional benefits to a system user, but may also place increased demands on the control and management of various device components. For example, in certain environments, an ion trap device may be utilized to perform various analysis procedures upon ionized test samples. Ions from a test sample trapped within the ion trap may be ejected or "scanned out" in a mass-selective manner through one or more ejection slots in the ion trap, and by detecting the ejected ions, a mass spectrum corresponding to the injected test sample may be created.

The utilization of such ejection slots may cause the electromagnetic field characteristics of the ion trap to exhibit certain undesired non-linear properties. In order to perform an optimized analysis of ionized test samples, an ion trap should ideally be operated with field characteristics that are as linear as possible. Therefore, in certain embodiments, the physical characteristics of an ion trap may be selected to compensate for the ejection slots, and thereby provide more linear field characteristics within the ion trap.

Altering physical dimensions of an ion trap may improve non-linear field characteristics, but may also result in an unbalanced centerline potential in the ion trap. Such an unbalanced centerline potential may cause various performance problems during operation of the ion trap. For example, ion injection procedures for inserting an ionized test sample into the ion trap may be negatively affected when incoming ions are subject to an unbalanced centerline potential. This unbalanced centerline potential may result in poor injection efficiency or significant mass bias in the trapping efficiency of ion trap devices.

Due to growing demands on system resources and increasing complexity of analysis requirements, it is apparent that developing new techniques for implementing analytical instrumentation is a matter of concern for related electronic technologies. Therefore, for all the foregoing reasons, developing effective techniques for implementing analytical instrumentation remains a significant consideration for designers, manufacturers, and users of contemporary analytical instruments.

SUMMARY

In accordance with the present invention, a system and method are disclosed for effectively compensating for an unbalanced or non-zero centerline radio-frequency potential in a two dimensional linear quadrupolar ion trap, the unbalanced centerline potential created by a compensation feature that minimizes non-linear field components created by one or more ejection slots in the ion trap. In one embodiment, the ion trap includes, but is not limited to, a pair of Y electrodes and a pair of X electrodes that are each positioned around a centerline, and a Z axis that runs longitudinally through a trapping volume. The X electrodes include one or more ejection slots for scanning injected ions out of the ion trap.

In certain embodiments, a Y electrode separation distance may be defined along a Y axis that runs between the Y electrodes through the centerline. Similarly, an X electrode separation distance may be defined along an X axis that runs between the X electrodes through the centerline. In certain embodiments, the compensation feature is provided by the ion trap being "stretched" in the X axis direction by causing the X separation distance to be greater than the Y separation distance. This stretching procedure in the X axis direction has the beneficial effect of compensating for the ejection slots to provide more linear field characteristics or to minimize the non-linear field components within the ion trap device.

In certain embodiments, a Y radio-frequency (RF) signal is applied to the Y electrodes which effects trapping of injected ions within the ion trap. Similarly, an X radio-frequency (RF) signal is applied to X electrodes which effects trapping of injected ions within the ion trap. However, these voltages and their effects are not necessarily exclusive. The Y RF signal and the X RF signal are typically of the same frequency and are 180 degrees out-of-phase with respect to each other.

In accordance with one embodiment of the present invention, the Y RF signal and the X RF signal are specifically selected to have non-matching voltage levels. In certain embodiments, the amplitude of the X RF signal is selected to be greater than the amplitude of the Y RF signal in order to compensate for the greater distance that the X electrodes are positioned from the centerline to thereby provide a balanced potential at the centerline. For example, in certain embodiments, the amplitude of the X RF signal may be increased by approximately forty-four percent with respect to the amplitude of the Y RF signal.

In accordance with the present embodiment, utilizing the foregoing non-matching RF signals in the X axis direction and the Y axis direction advantageously results in a balanced potential of approximately zero Volts at the centerline of the ion trap device. For at least the foregoing reasons, the present invention provides an improved system and method for effectively implementing balanced RF fields in an ion trap.

BRIEF DESCRIPTION OF THE DRAWINGS

For a better understanding of the nature and objects of the invention, reference should be made to the following detailed description, taken in conjunction with the accompanying drawings, in which:

FIGS. 7A, 7B, and 7C are waveforms illustrating an unbalanced centerline potential for one embodiment of the ion trap of FIG. 4;

FIGS. 8A, 8B, 8C, and 8D are diagrams illustrating a balanced centerline potential for one embodiment of the ion trap of FIG. 6;

Like reference numerals refer to corresponding parts throughout the several views of the drawings.

DETAILED DESCRIPTION OF EMBODIMENTS

The present invention relates to an improvement in analytical instrumentation techniques. The following descriptions and illustrations are presented to enable one of ordinary skill in the art to make and use the invention and is provided in the context of a patent application and its requirements. Various modifications to the disclosed embodiments will be apparent to those skilled in the art, and the generic principles herein may be applied to other embodiments. Thus, the present invention is not intended to be limited to the embodiments shown, but is to be accorded the widest scope consistent with the principles and features described herein.

Figure 1:
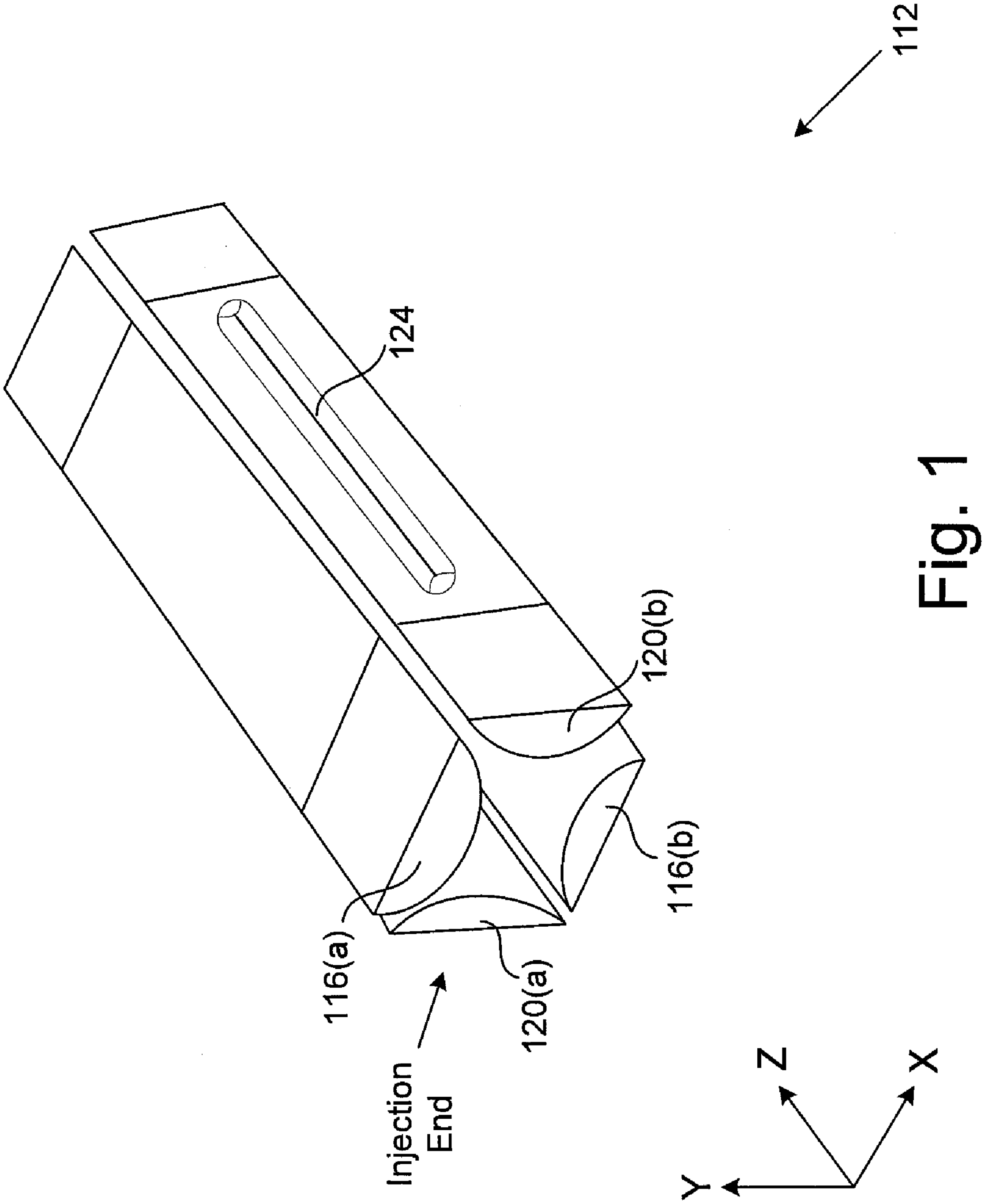
FIG. 1 is an elevation view of an ion trap, in accordance with one embodiment of the present invention.

Referring now to FIG. 1, an elevation view of an ion trap 112 is shown, in accordance with one embodiment of the present invention. In alternate embodiments, the embodiments of FIGS. 1-12 may be implemented using components and configurations in addition to, or instead of, certain of those components and configurations discussed in conjunction with the embodiments shown in FIGS. 1-12. For example, the FIG. 1 embodiment shows a three-sectioned ion trap 112, however, the present invention is not limited to this particular sectional configuration. In addition, FIGS. 1-12 show drawings that are presented herein to illustrate and discuss certain principles of the present invention, and therefore FIGS. 1-12 should not necessarily be construed to represent absolute scale drawings of the portrayed subject matter.

In the FIG. 1 embodiment, ion trap 112 includes, but is not limited to, a pair of Y electrodes 116(*a*) and 116(*b*) that are oppositely aligned along a vertical Y axis. In addition, ion trap 112 also includes a pair of X electrodes 120(*a*) and 120(*b*) that are oppositely aligned along a horizontal X axis. In the FIG. 1 embodiment, the foregoing horizontal X axis is rotated approximately ninety degrees from the vertical Y axis. Each of the electrodes 116(*a*), 116(*b*), 120(*a*), and 120(*b*) is approximately parallel to a longitudinal Z axis that forms a centerline through a trapping volume within ion trap 112. The foregoing Z axis is approximately orthogonal to both the X axis and the Y axis.

In operation, various selected trapping potentials are applied to the X electrodes 120(*a*) and 120(*b*), and to the Y electrodes 116(*a*) and 116(*b*) to contain injected ions within ion trap 112. In the FIG. 1 embodiment, the foregoing trapping potentials may include appropriate radio-frequency (RF) signals generated from any effective signal source. Ions from an ionized test sample may then be injected into the trapping volume through an ion injection end of ion trap 112. The ions within ion trap 112 may then be radially ejected or "scanned out" in a mass-selective manner through opposing ejection slots 124 in X electrodes 120(*a*) and 120(*b*).

In certain embodiments, ion trap 112 may have a different number of ejection slots 124 (for example, a single ejection slot 124). By detecting the ejected ions, a mass spectrum corresponding to the injected test sample may advantageously be created. More detailed discussions for various embodiments of ion traps may be found in U.S. Pat. No. 6,797,950 entitled "Two-Dimensional Quadrupole Ion Trap Operated as a Mass Spectrometer" that issued on Sep. 28, 2004, and in U.S. Pat. No. 5,420,425 entitled "Ion Trap Mass Spectrometer System And Method" that issued on May 30, 1995. The implementation and functionality of ion trap 112 are further discussed below in conjunction with FIGS. 2 through 11.

Figure 2:
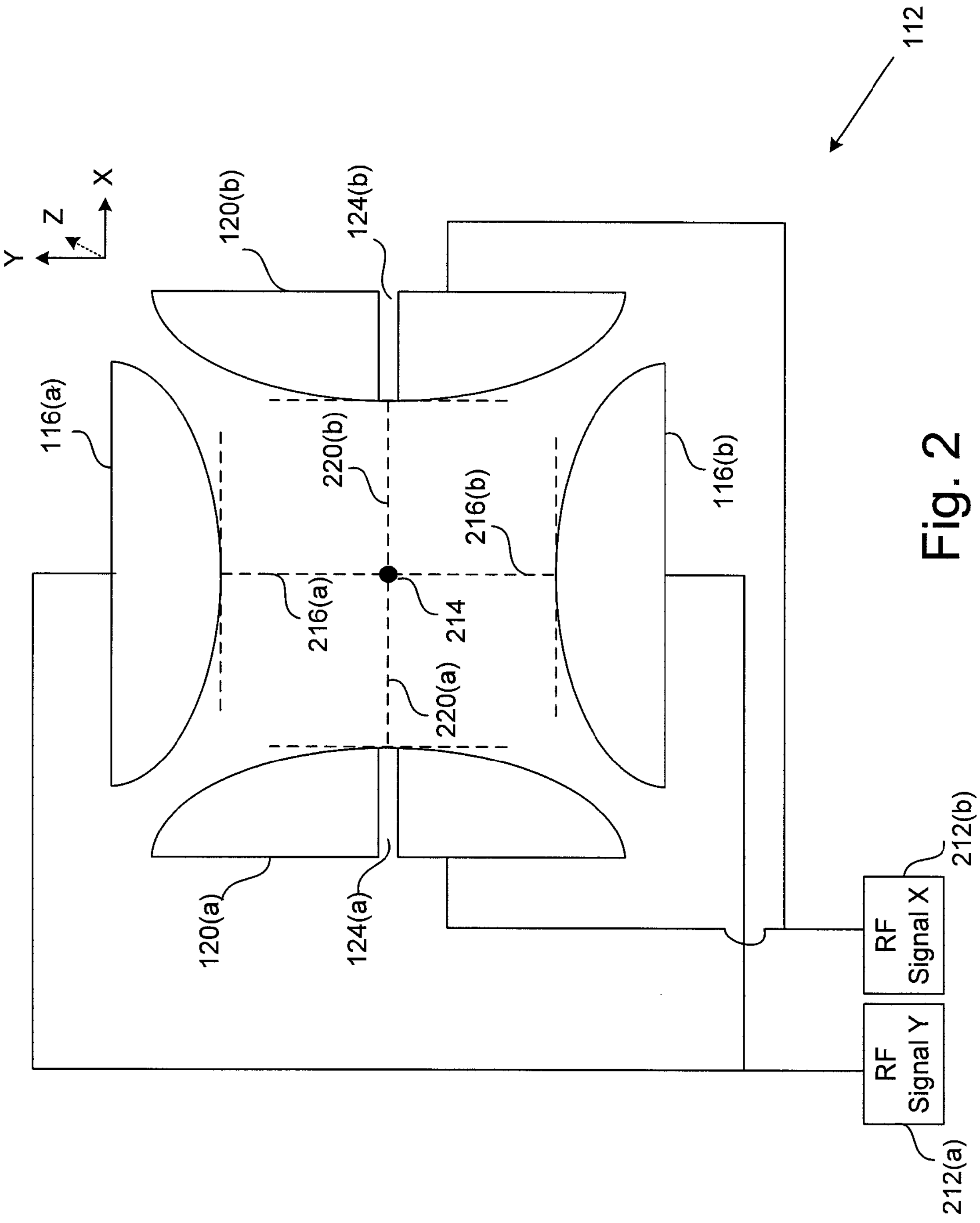
FIG. 2 is a cross-sectional view for one basic embodiment of the ion trap of FIG. 1.

Referring now to FIG. 2, a cross-sectional view for one basic embodiment of the FIG. 1 ion trap 112 is shown. The FIG. 2 embodiment shows a cross section of ion trap 112 as viewed from either end of ion trap 112 along the Z axis (see FIG. 1). In the FIG. 2 embodiment, ion trap 112 includes, but is not limited to, Y electrode 116(*a*), Y electrode 116(*b*), X electrode 120(*a*), and X electrode 120(*b*) that are each positioned around a centerline 214 that runs longitudinally through the trapping volume of ion trap 112 along the Z axis. In the FIG. 2 embodiment, X electrode 120(*a*) includes an ejection slot 124(*a*), and X electrode 120(*b*) similarly includes an ejection slot 124(*b*) for scanning ions out of ion trap 112.

In the FIG. 2 embodiment, the Y axis is formed of a Y segment 216(*a*) and a Y segment 216(*b*). Y segment 216(*a*) is the distance from centerline 214 to Y electrode 116(*a*), and Y segment 216(*b*) is the distance from centerline 214 to Y electrode 116(*b*). In the FIG. 2 embodiment, Y segment 216(*a*) and segment 216(*b*) are approximately equal in length. Similarly, the X axis is formed of an X segment 220(*a*) and an X segment 220(*b*). X segment 220(*a*) is the distance from centerline 214 to X electrode 120(*a*), and X segment 220(*b*) is the distance from centerline 214 to X electrode 120(*b*). In the FIG. 2 embodiment, X segment 220(*a*) and segment 220(*b*) are approximately equal in length.

In the FIG. 2 embodiment, a radio-frequency (RF) signal Y 212(*a*) is applied to Y electrodes 116(*a*) and 116(*b*) which effects trapping of injected ions within ion trap 112. Similarly, a radio-frequency (RF) signal X 212(*b*) is applied to X electrodes 120(*a*) and 120(*b*) which effects trapping of injected ions within ion trap 112. In the FIG. 2 embodiment, RF signal Y 212(*a*) and RF signal X 212(*b*) are typically of the same approximate frequency and are approximately 180 degrees out of phase with respect to each other. In the ideal case of FIG. 2 ion trap 112, centerline 214 typically has a potential of approximately zero volts. One problem with regard to the electromagnetic fields generated in the FIG. 1 ion trap 112 is further discussed below in conjunction with FIG. 3.

Figure 3A:
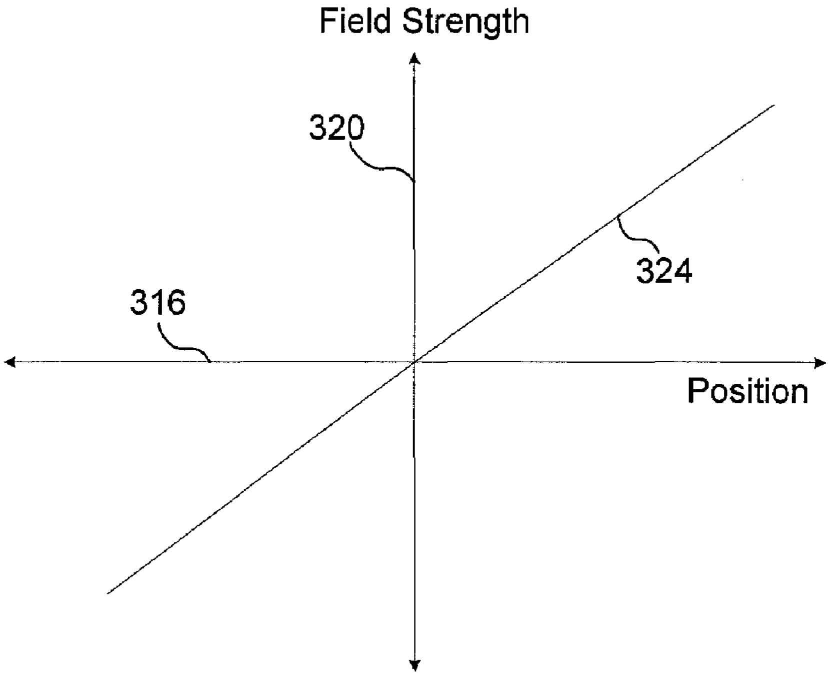
FIGS. 3A and 3B are graphs illustrating linear field strength characteristics and non-linear field strength characteristics of an ion trap.
Figure 3B:
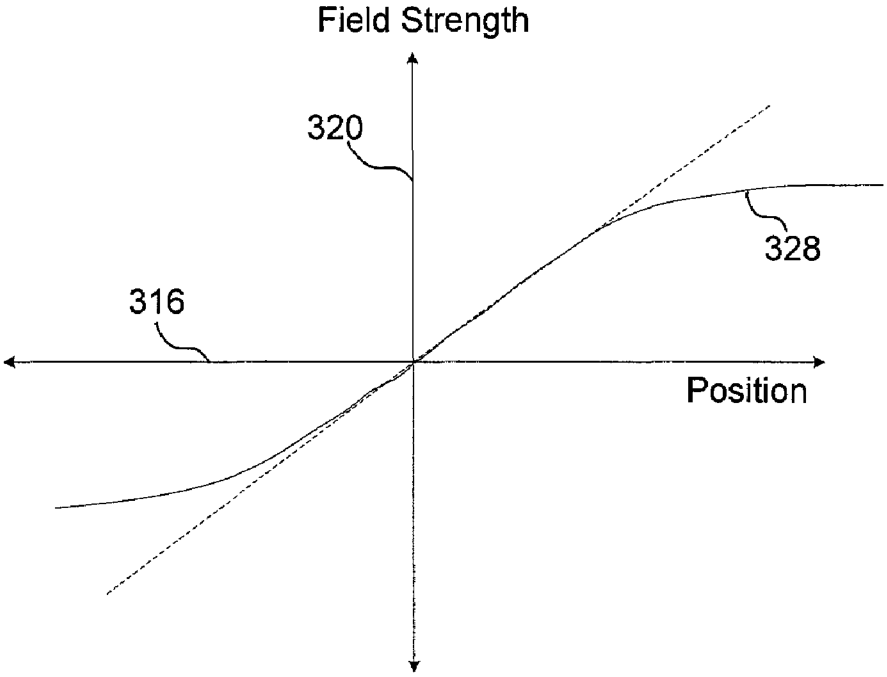

Referring now to FIGS. 3A and 3B, graphs illustrating linear field strength characteristics and non-linear field strength characteristics of the FIG. 1 ion trap 112 are shown. In the graph of FIG. 3A, field strength within an ideal ion trap is shown on a vertical axis 320, while the horizontal axis 316 shows the position within the ideal ion trap. The FIG. 3A graph illustrates that an ideal ion trap would theoretically exhibit linear field strength characteristics throughout the entire ion trap trapping volume. However, certain ion traps (including ion trap 112 of FIG. 1) have ejection apertures, slots 124(*a*) and 124(*b*) that are cut through X electrodes 120(*a*) and 120(*b*). These ejection slots 124(*a*) and 124(*b*) modify the electromagnetic field characteristics within ion trap 112 by, for example, providing more non-linear field components, and typically reducing the quadrupolar potential component.

The FIG. 3B graph illustrates that FIG. 2 ion trap 112 exhibits a non-linear field strength characteristic, in particular a negative deviation, as a result of ejection slots 124(*a*) and 124(*b*). In order to perform an optimized analysis of ionized test samples, ion trap 112 should ideally be operated with field characteristics that are linear, or as less negative, as possible. For example, these type of fields may cause chemical dependant mass shifts to be observed which result in incorrect mass assignments. These mass shifts are described in greater detail in Chapter 4(IV) of "*Practical Aspects of Ion Trap Mass Spectrometry", Volume* 1, "*Fundamentals of Ion Trap Mass Spectrometry, CRC Series Modern Mass Spectrometry",* Edited by Raymond E. March and John F. J. Todd, which is hereby incorporated by reference. One implementation to minimize or compensate for the non-linear field components in the FIG. 2 ion trap 116 is further discussed below in conjunction with FIG. 4.

Figure 4:
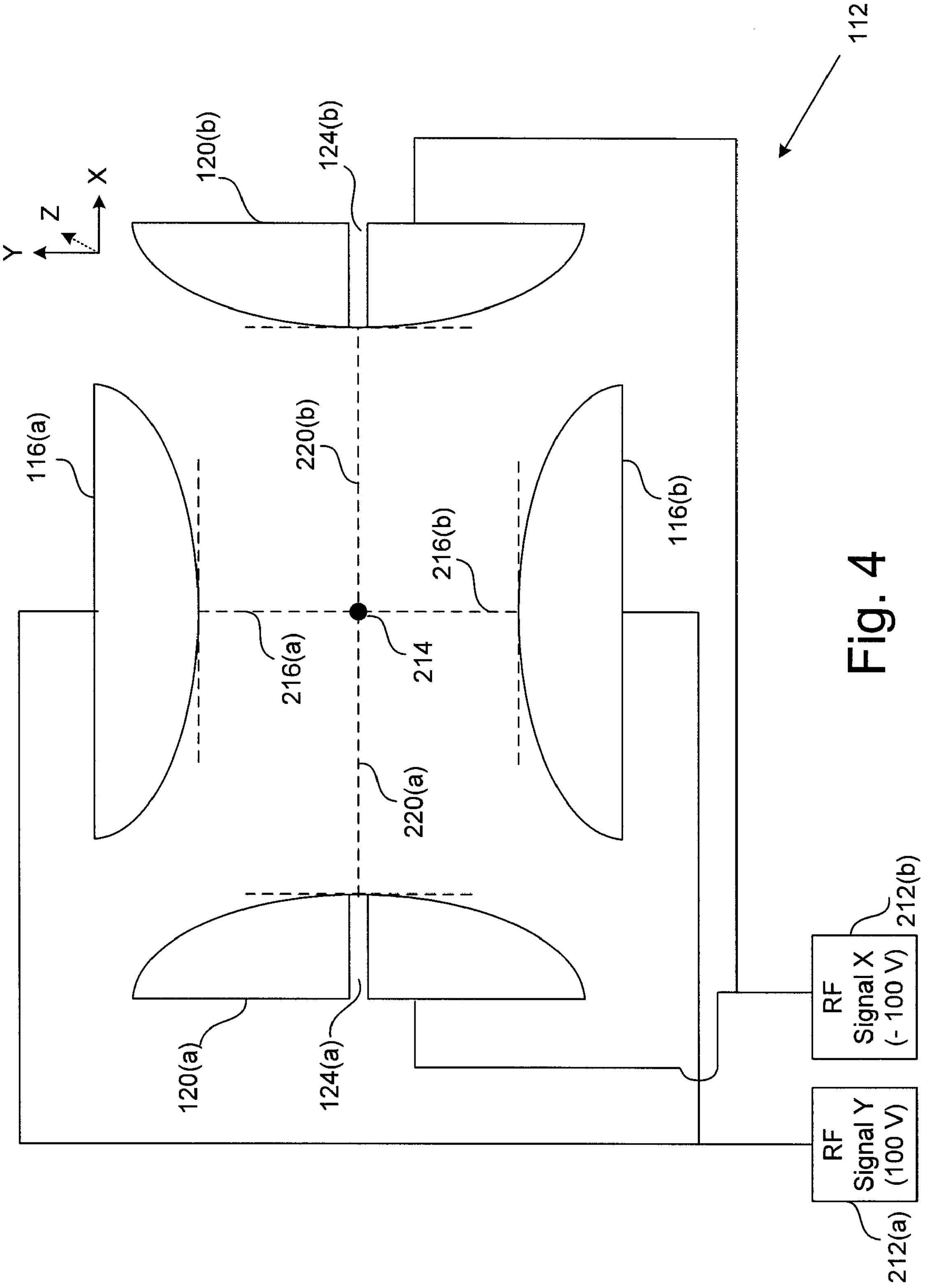
FIG. 4 is a cross sectional view for one embodiment of the ion trap of FIG. 1.

Unlike in the FIG. 2 embodiment, the FIG. 4 embodiment shows an ion trap 112 which incorporates a compensation feature, namely the ion trap is "stretched" in the X axis direction by causing both X segments 220(*a*) and 220(*b*) to be longer than Y segments 216(*a*) and 216(*b*). The foregoing stretching procedure in the X axis direction has the beneficial effect of compensating for ejection slots 124(*a*) and 124(*b*) to provide more linear field characteristics within ion trap 112.

In addition, in the FIG. 4 embodiment, RF signal Y 212(*a*) and RF signal X 212(*b*) are of the same approximate voltage levels, as is typically the case. For purposes of illustration, FIG. 4 shows RF signal Y 212(*a*) as being equal to 100 Volts, and shows RF signal X 212(*b*) as being matched to RF signal Y 212(*a*), but 180 degrees out-of-phase (minus 100 Volts). Any other effective and appropriate matching voltage level may also be utilized. This configuration, as a result of the equal magnitudes of the voltage, but unequal electrodes spacing, results in a substantial centerline potential which is substantially not equal to zero. One problem with regard to an unbalanced potential of centerline 214 in the FIG. 4 ion trap 112 is further discussed below in conjunction with FIG. 5.

Figure 5:
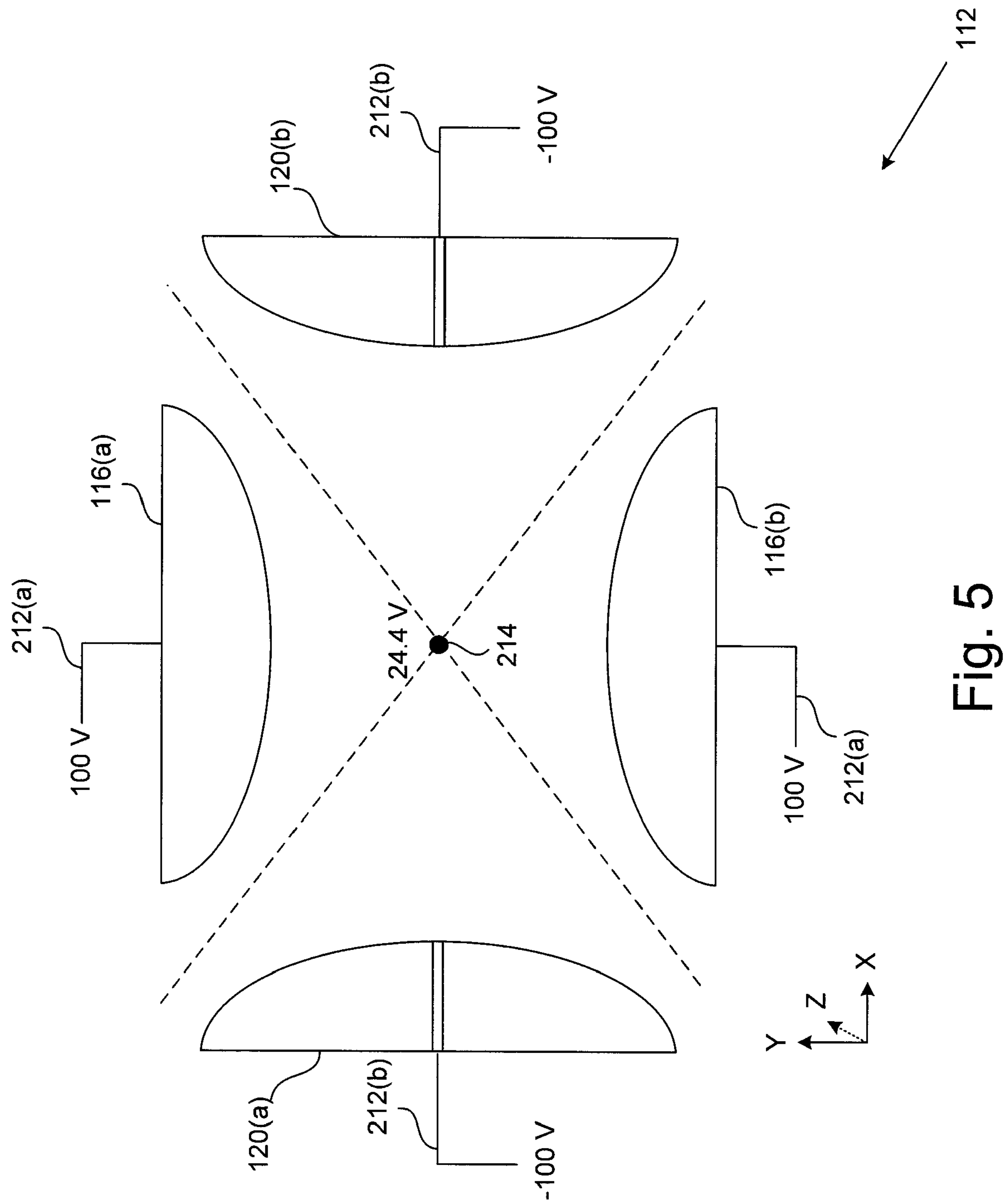
FIG. 5 is a diagram illustrating an unbalanced centerline potential for one embodiment of the ion trap of FIG. 4.

The diagram of FIG. 5 shows a cross section of the FIG. 4 ion trap 112 as viewed from either end of ion trap 112 along the Z axis (see FIG. 1). In the FIG. 5 embodiment, ion trap 112 includes, but is not limited to, Y electrode 116(*a*), Y electrode 116(*b*), X electrode 120(*a*), and X electrode 120(*b*) that are each positioned around a centerline 214 that runs longitudinally through the trapping volume of ion trap 112 along the Z axis. As shown in the FIG. 5 diagram, ion trap 112 comprises a compensation feature; it is "stretched" in the X axis direction to compensate for certain field defects, as previously discussed above in conjunction with FIGS. 2-4.

In the FIG. 5 diagram, centerline 214 is shown with an unbalanced and non-zero potential of approximately 24.4 Volts which corresponds to the resultant potential when the X electrodes are spaced out a particular amount. Of course, in alternate embodiments, various other unbalanced centerline potentials may be created, depending upon the particular implementation of ion trap 112. In the FIG. 5 embodiment, X electrodes 120(*a*) and 120(*b*) are positioned farther away from centerline 214 than Y electrodes 116(*a*) and 116(*b*), and therefore have less influence upon the centerline potential of the FIG. 5 ion trap 112.

As mentioned previously, the difference in electrode positioning in the X axis direction and the Y axis direction improves (typically minimizing) non-linear field characteristics, but also results in an unbalanced centerline potential in ion trap 112. Such an unbalanced centerline potential may cause various performance problems during operation of ion trap 112. For example, the ion injection procedure for inserting an ionized test sample into ion trap 112, which includes injecting ions along the center axis, may be negatively affected when incoming ions are subject to an unbalanced centerline potential versus having a balanced zero Volt potential at centerline 214. This can result in poor injection efficiency or significant mass bias in the trapping efficiency. In addition, in certain embodiments, various types of problems may also occur when ejecting ions from ion trap 112 as a result of an unbalanced centerline potential. Ejection of ions occurs during mass analysis, ion isolation, or axial ejection into a second analyzing device. A non-zero-centerline can cause kinetic energy spread in the axial ejected ions which may be problematic for the second analyzing device. One embodiment for correcting the unbalanced centerline potential in the FIG. 5 ion trap 112 is further discussed below in conjunction with FIGS. 6 through 8D.

Figure 6:
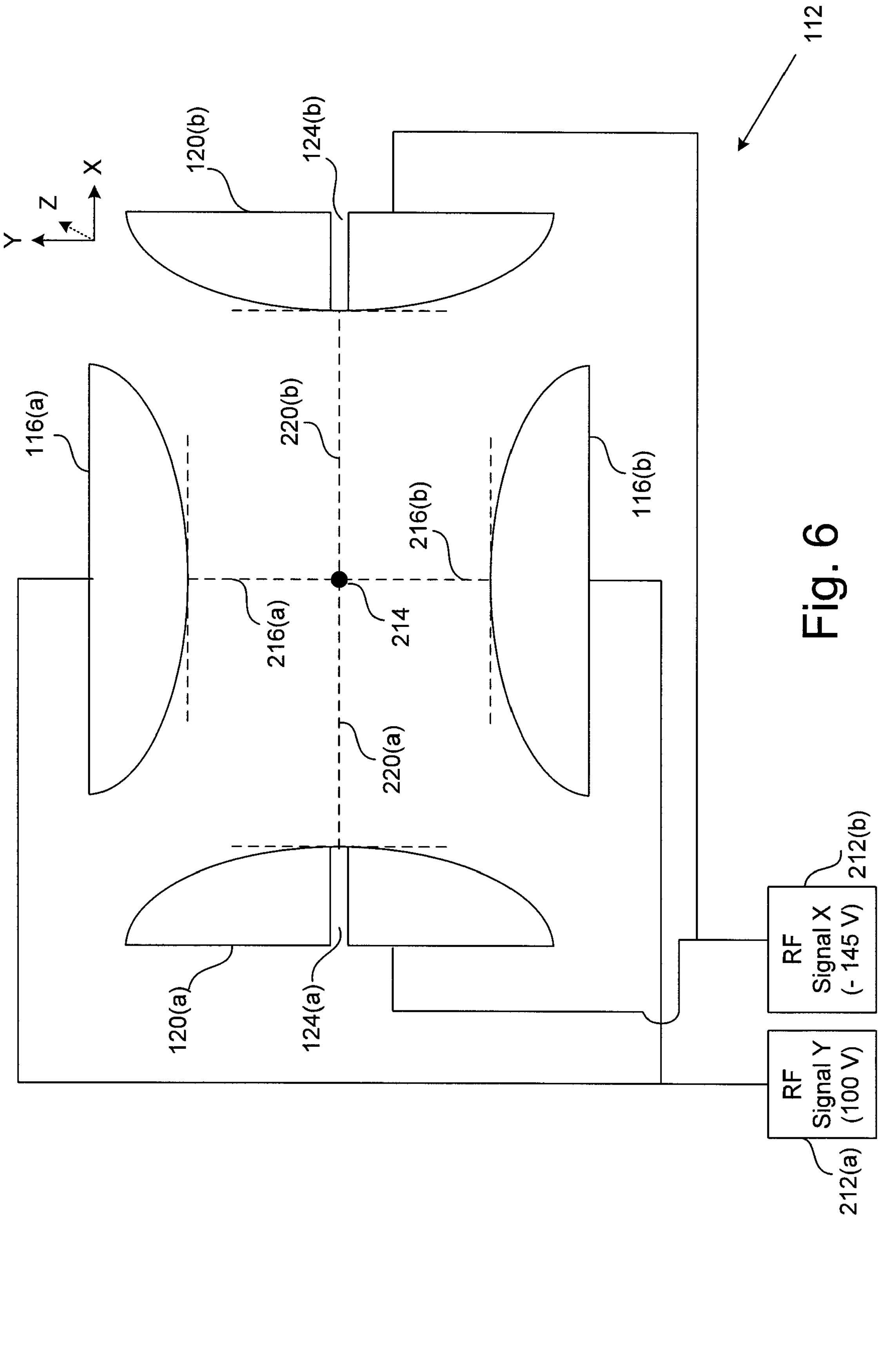
FIG. 6 is a cross sectional view for one embodiment of the ion trap of FIG. 1, in accordance with the present invention.

In FIG. 6, the embodiment is similar to FIG. 4, however the RF signal Y 212(*a*) and RF signal X 212(*b*) are specifically selected to be non-matching voltage levels. In the FIG. 6 embodiment, the amplitude of RF signal X 212(*b*) is selected to be greater than the amplitude of RF signal Y 212(*a*) in order to compensate for the greater distance that the X electrodes 120(*a*) and 120(*b*) are positioned from centerline 214 and to thereby provide a balanced or near-zero potential at centerline 214. For purposes of illustration, FIG. 6 shows RF signal Y 212(*a*) as being equal to 100 Volts, and shows RF signal X 212(*b*) as being equal to minus 145 Volts. Again, this would correspond to a particular X electrode displacement, however, any other effective and appropriate non-matching voltage levels may also be utilized. For example, in certain embodiments, the amplitude of RF signal X 212(*b*) may be increased by approximately 44 percent with respect to the amplitude of RF signal Y 212(*a*). In certain embodiments, the X signal amplitude may be selected to create a centerline radio-frequency potential that is less than a given percentage (e.g., five percent, two percent, or one percent) of the Y signal amplitude. Utilizing non-matching RF signals to implement a balanced potential of centerline 214 in ion trap 112 is further discussed below in conjunction with FIGS. 8A-8D.

Referring now to 7A, 7B, and 7C, specific time-dependent waveforms further illustrating the unbalanced centerline potential for one embodiment of the FIG. 4 ion trap 112 are shown. In the graphs of FIGS. 7A, 7B, and 7C, time is shown on a horizontal axis 324, and amplitude is shown on a vertical axis 316. In the FIG. 7A graph, for purposes of illustration, RF signal X 212(*b*) varies between plus and minus 100 Volts. Similarly, in the FIG. 7B graph, RF signal Y 212(*a*) varies between plus and minus 100 Volts, but is 180 degrees out of phase with RF signal X 212(*b*). In the FIG. 7C graph, due to the misbalance of the potentials between the X and Y directions near the centerline, the potential at the centerline 214 is significantly non-zero, and is shown varying between plus and minus 24.4 Volts.

This can be contrasted to the graphs of FIGS. 8A, 8B, and 8C, which show waveforms illustrating a balanced centerline potential for one embodiment of the FIG. 6 ion trap 112. In the FIG. 8A graph, for purposes of illustration, RF signal X 212(*b*) varies between plus and minus 145 Volts. However, in the FIG. 8B graph, RF signal Y 212(*a*) varies between plus and minus 100 Volts, but is 180 degrees out of phase with RF signal X 212(*b*). The amplitude of RF signal X 212(*b*) is therefore non-matching with respect to the amplitude of RF signal Y 212(*a*), however due to the different spacing of X and Y electrodes, the potentials near the centerline are more equal, but opposite. The result of these two balanced potentials is that the centerline potential 214 shown in the FIG. 8C graph is nearly zero Volts. In one aspect of the invention not only is a balanced centerline potential achieved, but in combination with the appropriate compensation feature, the quadrupole potential component present in the quadrupolar ion trap is maximized, and typically the non-linear field components (that being octopole and higher order multipoles) are minimized.

Figure 8D:
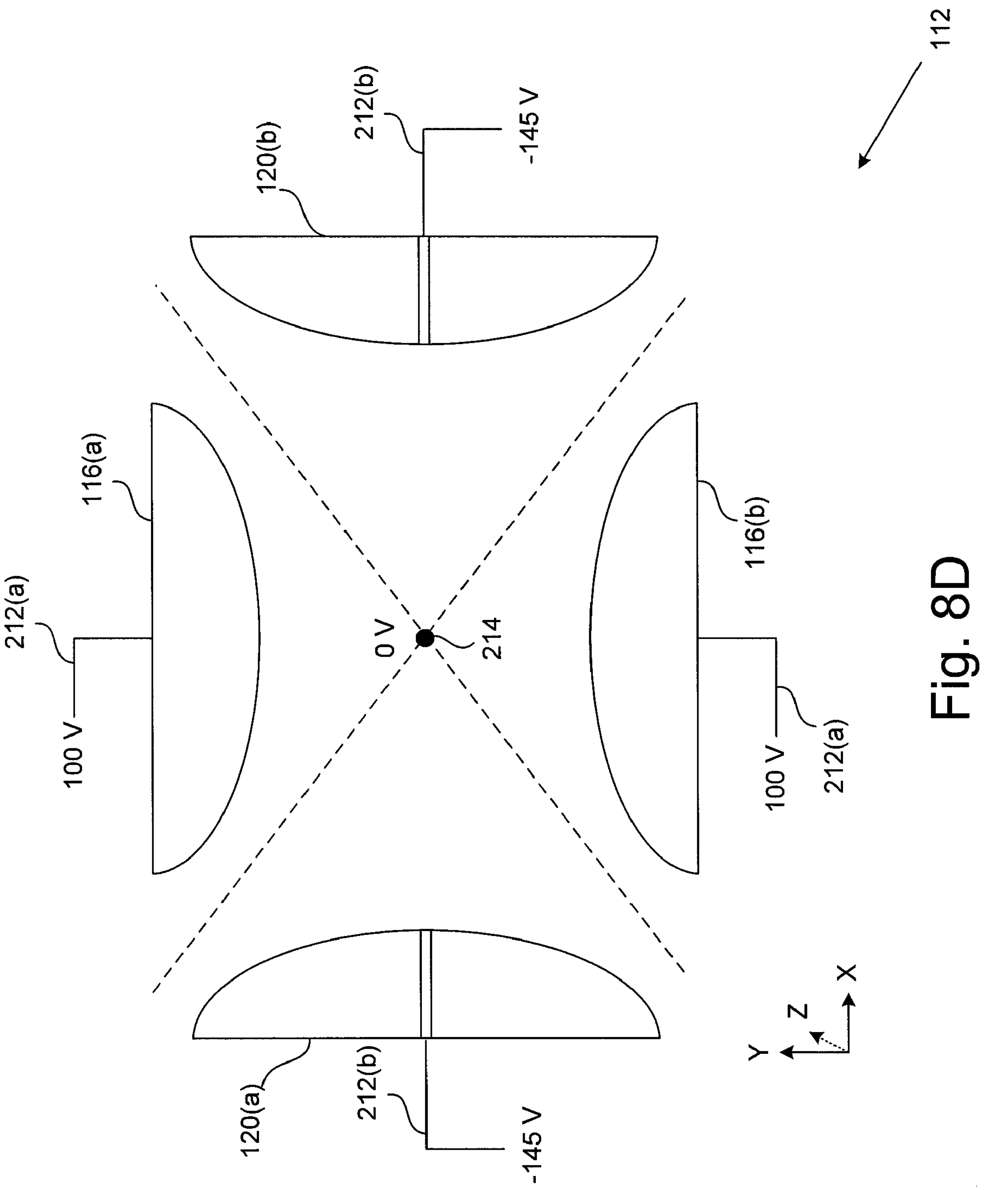

Referring now to FIG. 8D, a similar diagram to FIG. 5 illustrating a balanced centerline potential for one embodiment of the FIG. 6 ion trap 112 is shown. Like in FIGS. 6 and 7, in the FIG. 8D embodiment, RF signal Y 212(*a*) and RF signal X 212(*b*) are not the same matching voltage levels. In the FIG. 8D embodiment, the amplitude of RF signal X 212(*b*) is selected to be greater than the amplitude of RF signal Y 212(*a*) in order to compensate for the greater distance that X electrodes 120(*a*) and 120(*b*) are positioned from centerline 214. For purposes of illustration, FIG. 8D shows RF signal Y 212(*a*) as being equal to 100 Volts, and shows RF signal X 212(*b*) as being equal to minus 145 Volts. However, any other effective and appropriate non-matching voltage levels may also be selected and utilized.

As illustrated in the FIG. 8D diagram, utilizing the foregoing non-matching RF signals in the X axis direction and the Y axis direction advantageously results in a balanced centerline potential of approximately zero Volts at centerline 214. Another embodiment for correcting an unbalanced centerline potential in ion trap 112 is discussed below in conjunction with FIGS. 9 through 11.

Figure 9:
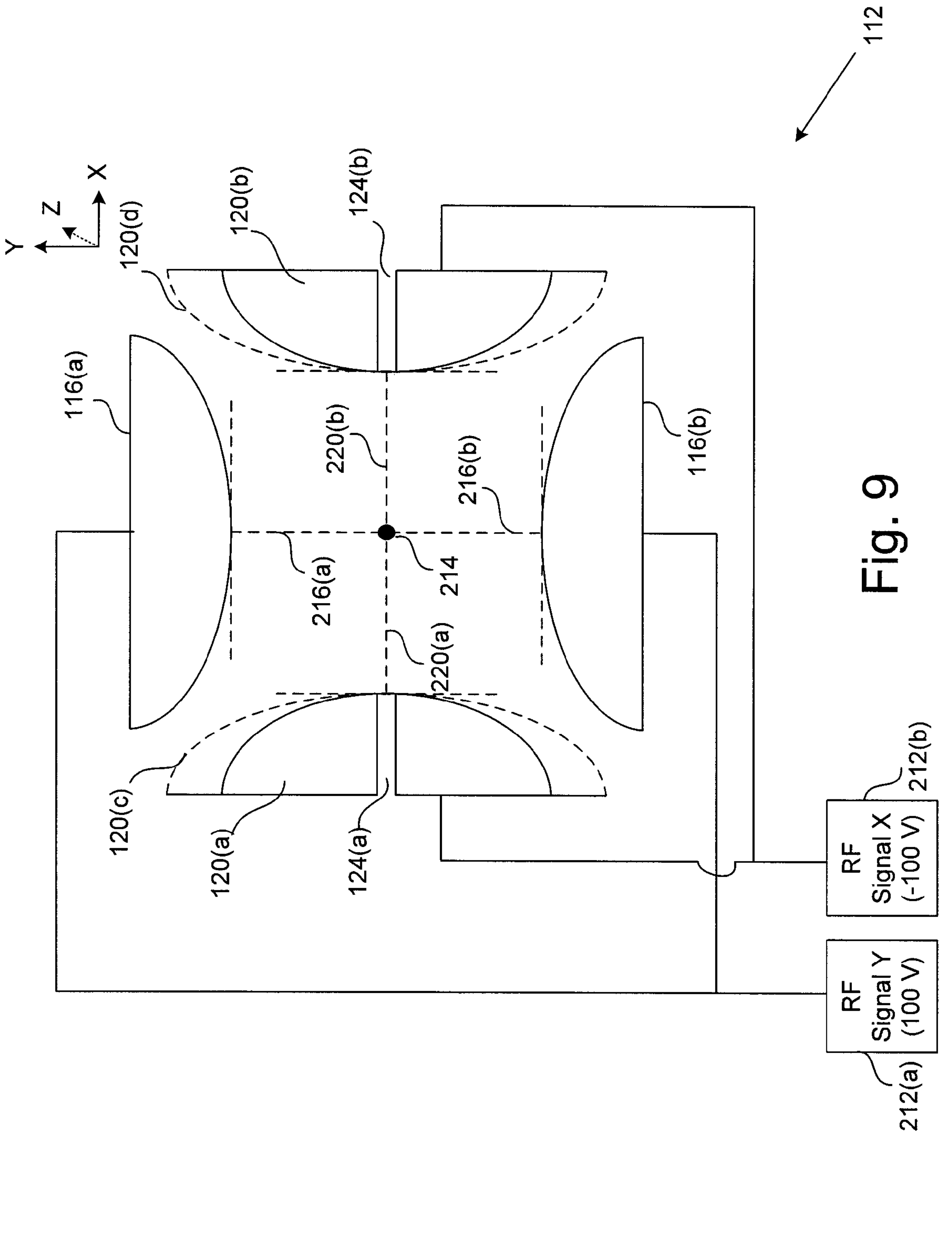
FIG. 9 is a cross sectional view for one embodiment of the ion trap of FIG. 1, in accordance with the present invention.

Referring now to FIG. 9, a cross-sectional view for another embodiment of the FIG. 1 ion trap 112 is shown. The FIG. 9 embodiment shows a cross section of ion trap 112 as viewed from either end of ion trap 112 along the Z axis (see FIG. 1). In the FIG. 9 embodiment, ion trap 112 includes, but is not limited to, Y electrode 116(*a*), Y electrode 116(*b*), X electrode 120(*a*), and X electrode 120(*b*) that are each positioned around a centerline 214 that runs longitudinally through the trapping volume of ion trap 112 along the Z axis. In the FIG. 9 embodiment, X electrode 120(*a*) includes an ejection slot 124(*a*), and X electrode 120(*b*) similarly includes an ejection slot 124(*b*) for scanning ions out of ion trap 112.

In the FIG. 9 embodiment, the Y axis is formed of a segment 216(*a*) and a segment 216(*b*). Segment 216(*a*) is the distance from centerline 214 to Y electrode 116(*a*), and segment 216(*b*) is the distance from centerline 214 to Y electrode 116(*b*). In the FIG. 9 embodiment, segment 216(*a*) and segment 216(*b*) are approximately equal in length. Similarly, the X axis is formed of a segment 220(*a*) and a segment 220(*b*). Segment 220(*a*) is the distance from centerline 214 to X electrode 120(*a*), and segment 220(*b*) is the distance from centerline 214 to X electrode 120(*b*). In the FIG. 9 embodiment, segment 220(*a*) and segment 220(*b*) are approximately equal in length.

In the FIG. 9 embodiment, a radio-frequency (RF) signal Y 212(*a*) is applied to Y electrodes 116(*a*) and 116(*b*) to trap injected ions within ion trap 112. Similarly, a radio-frequency (RF) signal X 212(*b*) is applied to X electrodes 120(*a*) and 120(*b*) to trap injected ions within ion trap 112. In the FIG. 9 embodiment, RF signal Y 212(*a*) and RF signal X 212(*b*) are typically of the same approximate frequency and are approximately 180 degrees out of phase with respect to each other.

In addition, in the FIG. 9 embodiment, RF signal Y 212(*a*) and RF signal X 212(*b*) are typically of the same approximate voltage levels. For purposes of illustration, FIG. 9 shows RF signal Y 212(*a*) as being equal to 100 Volts, and shows RF signal X 212(*b*) as being matched to RF signal Y 212(*a*), but 180 degrees out-of-phase (minus 100 Volts). Any other effective and appropriate matching voltage level may also be utilized. In addition, in certain embodiments, the embodiment of FIG. 9 may utilize non-matching voltage levels for RF signal Y 212(*a*) and RF signal X 212(*b*), as shown and discussed in conjunction with FIG. 6.

In certain embodiments, Y electrode 116(*a*), Y electrode 116(*b*), X electrode 120(*a*), and X electrode 120(*b*) are implemented with hyperbolic electrode surfaces that each face centerline 214. However, any other effective electrode surface shape may alternately be utilized. For example, more complex curved, piecewise linear, or non-curved shapes, are possible. Surface geometries which incorporate one or more nicks (v-shaped, cross-sectional, partially circular, etc.), grooves, recesses, protrusions, moats or other such configurations as also within the scope of this invention. These surface geometries typically extend uniformly along the entire length of the electrode, in the Z axis. In certain simple embodiments, the electrode surfaces of ion trap 112 may be implemented as semi-circles in which the foregoing non-matching electrode shaping procedure is performed by reducing the effective radius of corresponding X electrodes 120(*a*) and 120(*b*).

In certain embodiments, the radius of Y electrode 116(*a*) and Y electrode 116(*b*) is approximately 4 millimeters, while the radius of X electrode 120(*a*) and X electrode 120(*b*) has been reduced to approximately 3.35 millimeters. In other embodiments, any other appropriate dimensions may be selected to produce a balanced zero Volt potential at centerline 214. In addition, in certain embodiments, instead of decreasing the radius of X electrode 120(*a*) and X electrode 120(*b*), the radius of Y electrode 116(*a*) and Y electrode 116(*b*) may be increased to achieve a similar result. As a result of the non-matching electrodes, the FIG. 9 ion trap 112 exhibits significantly improved linear field characteristics. One technique for performing a non-matching electrode shaping procedure for hyperbolic electrode surfaces is further discussed below in conjunction with FIG. 10.

Figure 10:
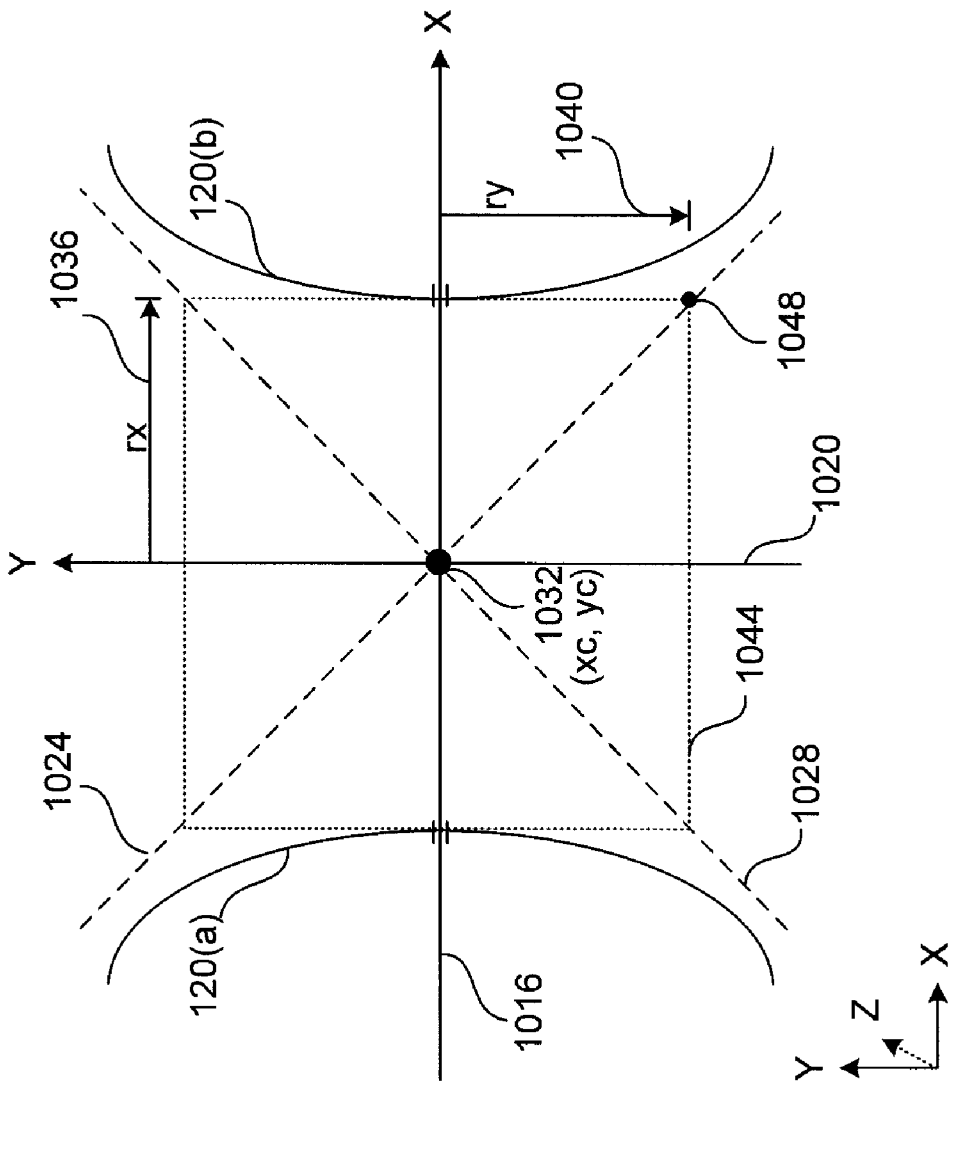
FIG. 10 is a diagram illustrating a technique for defining the radius of curvature of a hyperbola, in accordance with the present invention.

Referring now to FIG. 10, diagram illustrating a technique for defining the radius of curvature of a hyperbola is shown, in accordance with the present invention.

In the FIG. 10 diagram, hyperbolic electrode surfaces of X electrode 120(*a*) and 120(*b*) are shown facing (xc, yc) 1032 that is located at the intersection of a vertical Y axis 1020 and a horizontal X axis 1016. A first diagonal axis 1024 and a second diagonal axis 1028 intersect at offset 1032. Diagonal axis 1024 and diagonal axis 1028 also define the location of the four vertices of a polygon 1044. In accordance the FIG. 10 embodiment, an x radius (rx) value 1036 is shown as the distance from Y axis 1020 to X electrode 120(*b*) along horizontal axis 1016. In addition, a Y radius value (ry) 1040 is shown as the distance from horizontal axis to a Y vertices 1048 of polygon 1044.

The shape of other hyperbolic electrode surfaces of ion trap 112 may be defined by utilizing similar electrode shaping procedures. For example, in certain embodiments that have ejection slots 124(*a*) and 124(*b*) (FIG. 2) with a height of approximately 0.25 millimeters, Y electrodes 116(*a*) and 116(*b*) may be defined with variables xc and yc being approximately equal to zero, and variable rx and ry being approximately equal to 4 millimeters. In the foregoing example, X electrodes 120(*a*) and 120(*b*) may be defined with variable xc being approximately equal to 0.8 millimeters, variable yc being approximately equal to zero, and variables rx and ry being approximately equal to 3.2 millimeters. One effect of the foregoing electrode shaping procedure is further illustrated below in conjunction with FIG. 11.

Figure 11:
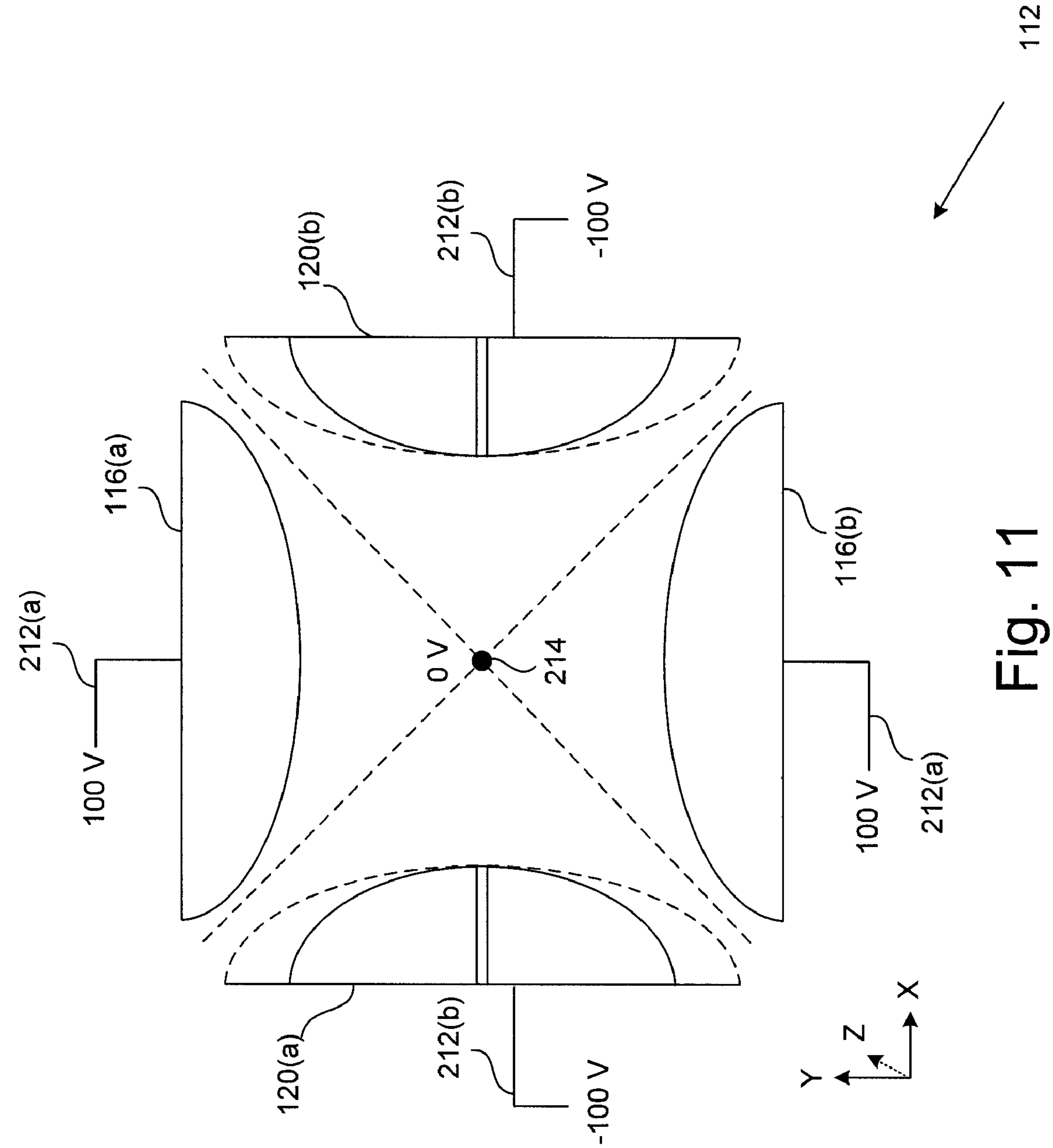
FIG. 11 is a diagram illustrating a balanced centerline potential for the ion trap of FIG. 9, in accordance with one embodiment of the present invention.

Referring now to FIG. 11, a diagram illustrating a balanced centerline potential for one embodiment of the FIG. 9 ion trap 112 is shown. The FIG. 11 diagram shows a cross section of the FIG. 9 ion trap 112 as viewed from either end of ion trap 112 along the Z axis (see FIG. 1). In the FIG. 11 embodiment, RF signal Y 212(*a*) and RF signal X 212(*b*) are typically of the same approximate frequency and are approximately 180 degrees out-of-phase with respect to each other. For purposes of illustration, FIG. 11 shows RF signal Y 212(*a*) as being equal to 100 Volts, and shows RF signal X 212(*b*) as being equal to minus 100 Volts. However, any other effective and appropriate voltage levels may also be selected and utilized. As discussed above in conjunction with the FIG. 9 embodiment, the shapes of X electrodes 120(*a*) and 120(*b*) have been selected to reduce the radius of curvature with respect to the radius of curvature of Y electrodes 116(*a*) and 116(*b*). The FIG. 11 embodiment thus provides for superior and relatively linear field characteristics in ion trap 112. For all of the foregoing reasons, the present invention therefore provides an improved system and method for effectively implementing balanced RF fields in ion trap 112.

The invention has been explained above with reference to certain embodiments. Other embodiments will be apparent to those skilled in the art in light of this disclosure. For example, the present invention may be implemented using configurations and techniques other than certain of those configurations and techniques described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A two-dimensional ion trap mass analyzer, comprising:

four elongated electrodes disposed around a device centerline, each of the electrodes having a curved surface oriented toward the centerline;

the four electrodes being arranged into first and second electrode pairs, each of the electrode pairs having two electrodes opposed across the centerline;

each of the electrodes of the first electrode pair being adapted with a slot permitting the ejection of ions therethrough;

a trapping voltage source configured to apply a first oscillatory signal to electrodes of the first electrode pair and a second oscillatory signal to electrodes of the second electrode pair, the first and second oscillatory signals having substantially equal frequencies and magnitudes; and the electrodes of the first electrode pair each having a radius of curvature that is smaller than a radius of curvature of the electrodes of the second electrode pair, the difference in the radii of curvature being selected to substantially reduce non-linear field components arising from the presence of the slots in the first electrode pair.

2. The ion trap mass spectrometer of claim 1, wherein each of the electrodes has a hyperbolic surface oriented toward the centerline.

3. The ion trap mass spectrometer of claim 1, wherein each of the electrodes has a hemi-cylindrical surface oriented toward the centerline.

* * * * *